May 19, 1925.
F. A. WHITTEN
TILTING BODY VEHICLE
Filed July 7, 1922
1,538,876
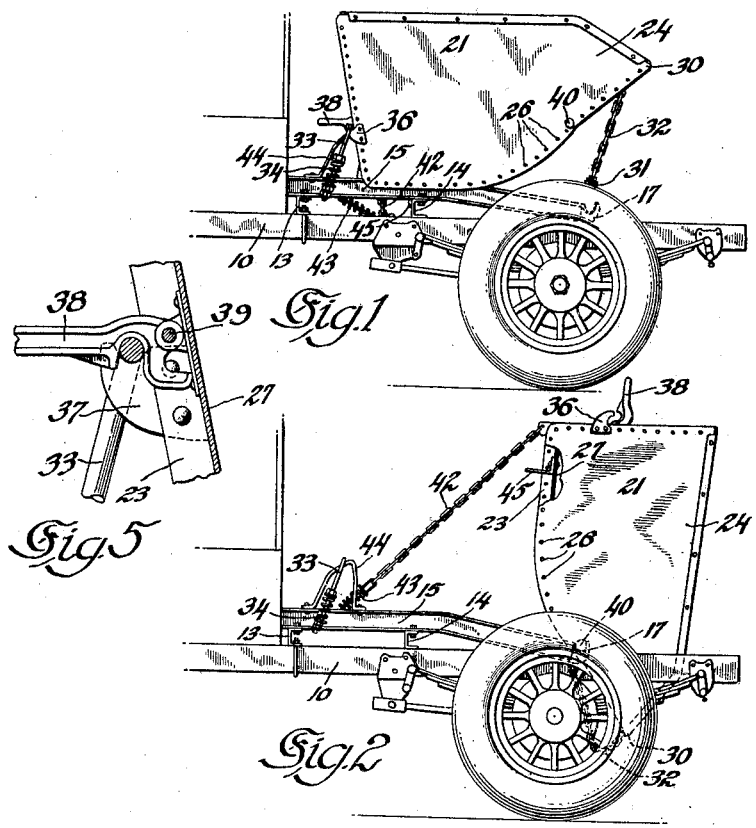
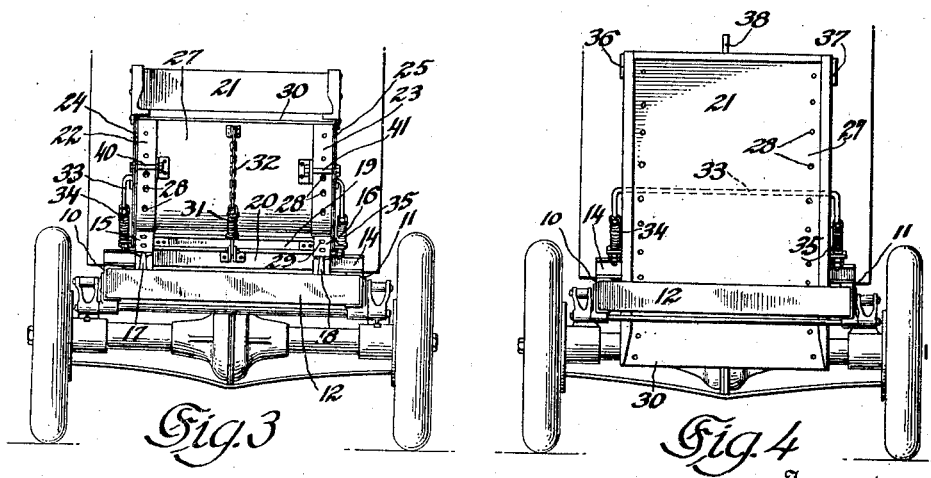
Inventor
Frank A. Whitten
By his Attorneys
Blackmore, Spencer & Flint Patented May 19, 1925.

1,538,876

UNITED STATES PATENT OFFICE.

FRANK A. WHITTEN, OF DETROIT, MICHIGAN, ASSIGNOR TO GENERAL MOTORS CORPORATION, OF DETROIT, MICHIGAN, A CORPORATION OF DELAWARE.

TILTING-BODY VEHICLE.

Application filed July 7, 1922. Serial No. 573,427.

*To all whom it may concern:*

Be it known that I, FRANK A. WHITTEN, a citizen of the United States, and a resident of Detroit, county of Wayne, and State of Michigan, have invented certain new and useful Improvements in Tilting-Body Vehicles, of which the following is a full, clear, concise, and exact description, such as will enable others skilled in the art to which the invention relates to make and use the same, reference being made therein to the accompanying drawings, which form a part of this specification.

My invention relates to vehicles or trucks of the general class or type having a dumping body, so that the material carried thereby can be discharged quickly and practically as a unitary mass; and particularly to dumping body trucks or vehicles wherein the load is carried in a tilting receptacle or body supported upon a suitable frame and from which the material may be discharged by tipping the body, and in which the material is discharged or dumped from the body at the rear end of the vehicle when the body is tipped.

In dumping body vehicles of the general type above referred to the tilting body or receptacle has ordinarily been so placed that its center of gravity is close to or immediately over, or even behind the rear axle of the vehicle; this location and arrangement being used because of the assumed necessity of discharging the contents of the receptacle beyond and free from the rear end of the frame whereby the receptacle is carried, and because of the fact that the spring arrangement for supporting the frame has ordinarily been such as to interfere with the operation of the body and the proper dumping of the contents therefrom elsewhere than beyond or rearwardly of the rearmost part of the vehicle frame; it being obviously necessary, or at least highly desirable, that the material as it flows from the body shall not come into contact with parts of the vehicle such as a spring thereof, a cross-bar of the frame, or other member. The result of such a location of the body and of such a scheme of dumping has been that an unduly large part of the load has been concentrated over or near the rear axle; thus necessitating the use of an unduly strong rear axle and spring arrangement and parts cooperating therewith at the rear end of the vehicle, and in a more costly construction than would be the case if the load carried were more evenly distributed between the front and rear axles.

The principal object of my invention is therefore to provide a dumping body vehicle or truck in which the load is dumped at the rear end thereof, and in which the center of gravity of the load while being transported is located farther forward than has heretofore commonly been the case, to thereby distribute the load more evenly between the front and rear axles; and a further object of my invention incident to the forward location of the load is to provide a dumping body truck of the type referred to wherein the load is dumped between side frame members of the frame thereof, and in which the rear end or discharge lip of the tilting receptacle or body moves downward between side members of the frame and in front of a rear cross member thereof during the dumping operation; the load being thus discharged downward and through the frame as distinguished from over and beyond the rear end thereof during the dumping operation.

With the above and other objects of invention in view my invention consists in the improved tilting body dumping vehicle or truck illustrated in the accompanying drawing and hereafter described and claimed; and in such variations and modifications thereof, within the scope of the concluding claims, as will be obvious to those skilled in the art to which my invention relates.

In the drawing accompanying and forming a part of this specification and wherein the preferred embodiment of my invention is illustrated:

Figure 1 is a fragmentary view showing the rear end of a truck in side elevation and equipped with a dumping body in accordance with my invention, the body being in its level or load carrying position.

Figure 2 is a similar view showing the body in its dumping or load discharging position.

Figure 3 is a view showing the truck in elevation and as seen from a position to the rear thereof, the body being in the position in which it is shown in Figure 1.

Figure 4 is a view similar to Figure 3 but showing the body in the position in which it appears in Figure 2.

Figure 5 is a detail view showing certain latch mechanism of the device upon a larger scale.

Referring to the drawing, the reference numerals 10, 11 designate two oppositely disposed side members of a truck frame, and 12 a cross bar at the rear end thereof; these being frame parts or elements of common form and my invention being in no way concerned with the specific construction of frame nor with the form of the various elements which constitute the same.

Secured to and supported by the side bars of the frame are two transverse sills 13, 14, and 15, 16 designate two tracks or rails supported by said sills and spaced inward from the side bars 10, 11 of the frame; the rear portions of said tracks being bent downward and provided with hook-shaped abutments 17, 18 at their rear ends. These tracks or rails are shown as tied together by cross bars 19, 20 to strengthen the structure and to provide elements cooperating with the tilting load carrying body which is supported thereby, as will hereinafter appear.

Supported upon the rails 15, 16 is a rocking or tilting load carrying hopper or body 21; the same preferably comprising angle iron frames 22, 23 bent to extend along the bottom and front and rear ends of the body, side plates 24, 25 secured along said frames by suitably spaced rivets 26, and a bottom plate 27 bent to conform with the frames and to provide a forward substantially flat and horizontal forward bottom and an upright front end, and a rear inclined bottom and end portion terminating in a pouring lip; said bottom plate being secured at its side edges to the frames 22, 23 by rivets 28. The rails 15, 16 are provided with holes 29 so spaced that the heads of the rivets 28 will enter them one after another as the body is tilted to dump the material therefrom; and the outer sides or flange of the angle iron frames 22, 23, being outside the said rails, prevent displacement of the body during the tilting thereof to dump the load and the return movement of the body into its load carrying position.

The body 21 is obviously narrower than the frame of the truck and the same is arranged and supported so far forward upon the frame that when the body is tilted to discharge its contents at the rear end of the vehicle the rear end of the body will move downward between the side members 10, 11, and in front of the rear cross bar 12; thus discharging the load downward through the frame as distinguished from over or beyond the rear end thereof and providing a construction wherein the center of gravity of the load while it is being carried before dumping is located well in front of the rear axle of the vehicle, and a construction in which (because of downwardly inclined rear portions of the rails 15, 16) the pouring lip 30 of the hopper will be brought closer to the ground than has heretofore commonly been the case in rearwardly discharging dumping body vehicles of the type or class to which my invention relates.

The body 21 is so shaped that when carrying its load and resting upon the flat portion of its bottom, as shown in Figure 1, it may nevertheless be readily tipped to dump the same; the initial movement being imparted to the body by a spring 31 which is pivotally connected with the cross bar 20 and with the body adjacent the lip through a chain 32, assisted by a push from the operator of the truck, if necessary. This spring is so arranged that it will be stressed when the operator returns the body to its level position after dumping, and will ordinarily act with sufficient force to accomplish the dumping when the operator releases the latch mechanism at the front end of the body which acts to prevent the dumping thereof while the load is being transported.

The latch mechanism referred to is shown as comprising a U-shaped bail 33 the depending sides of which extend loosely through holes in brackets carried by the track members 15, 16, and which bail is resiliently held in an upright position by springs 34, 35 surrounding the lower ends of said sides; and which bail is drawn into position over lugs 36, 37 at the sides of the body to hold the same horizontal, and is disengaged from said lugs to permit the contents of the body to be discharged, by a lever 38 pivotally supported at 39 centrally upon the front wall of the body and having cam surfaces adapted when the lever is operated by the operator of the vehicle to act upon the cross portion of the bail 33 to cause it to engage the said lugs 36, 37 and to move said bail out of engagement with the lugs. This latch mechanism, however, forms no part of the invention to which this present application relates, and the features of construction thereof are therefore not claimed herein.

The body 21 is provided with pins 40, 41 which come into contact with the hooks 17, 18 when the dumping occurs to thereby prevent the body from slipping off the rails; and the tilting movement of said body is limited by a centrally disposed chain 42 the lower end of which is connected with the front cross bar 19 through a spring buffer 43. The front wall of the body comes against a stop 44 (and another in line with it) carried by the rails 15, 16 when the body is in its horizontal position; and a transverse cleat 45 upon the bottom wall of the body lies in front of the rear cross sill 14 to more surely prevent displacement of the body while the same is in its level and load carrying position.

Having thus described and explained my invention, I claim and desire to secure by Letters Patent:

1. In a dumping body vehicle of the class described, a suitable frame having oppositely disposed side members; two tracks or rails supported by said side members and extending longitudinally of the frame, and which tracks are spaced inward from the vertical planes of said side members so as to lie closer together than said members; and a tilting body narrower than said frame and resting upon said rails, and having a pouring lip at its rear end; said body being so supported that said lip is always in front of the rear ends of said side members.

2. In a dumping body vehicle of the class described, a suitable frame having oppositely disposed side members; two tracks or rails supported by said side members and extending longitudinally of the frame, and which tracks are spaced inward on the vertical planes of said side members so as to lie closer together than said members, said tracks comprising front substantially horizontal portions and rear downwardly inclined portions; and a tilting body narrower than said frame and resting upon said rails, and having a pouring lip at its rear end.

3. In a dumping body vehicle of the class described, a suitable frame having oppositely disposed side members, and an end member connecting the rear ends of said side members together; two tracks or rails supported by said side members and extending longitudinally of the frame, and which tracks are spaced inward from the vertical planes of said side members so as to lie closer together than said members, said tracks comprising front substantially horizontal portions and rear downwardly inclined portions; and a tilting body narrower than said frame and resting upon said rails, and having a pouring lip at its rear end; said body being so arranged relative to the frame that the contents thereof is discharged over said lip and downward between the rear ends of said frame members and in front of said rear end connecting member as said body is tilted.

4. In a dumping body vehicle of the class described, a suitable frame having oppositely disposed side members, and an end member connecting the rear ends of said side members together; two tracks or rails supported by said side members and extending longitudinally of the frame, the front portions of said rails being substantially horizontal and the rear portions thereof being inclined downward, and said rails being spaced inward from the vertical planes of said side members so as to lie closer together than said side members; and a tilting body narrower than said frame and resting upon said rails, said body having a forward substantially horizontal bottom portion, and a rear inclined bottom and end portion terminating in a pouring lip; said body being supported in front of the rear axle of the vehicle and the length thereof being such that the lip aforesaid moves downward between said side frame members, and in front of said rear connecting member, as the body is tilted to discharge the contents thereof.

In testimony whereof I affix my signature.

FRANK A. WHITTEN.